US010924448B2

(12) United States Patent
Ward et al.

(10) Patent No.: US 10,924,448 B2
(45) Date of Patent: Feb. 16, 2021

(54) CONTENT DELIVERY FROM HOME NETWORKS

(71) Applicant: Cisco Technology, Inc., San Jose, CA (US)

(72) Inventors: David Ward, Los Gatos, CA (US); William Mark Townsley, Paris (FR); Andre Surcouf, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 262 days.

(21) Appl. No.: 15/488,761

(22) Filed: Apr. 17, 2017

(65) Prior Publication Data

US 2017/0302575 A1    Oct. 19, 2017

Related U.S. Application Data

(60) Provisional application No. 62/340,156, filed on May 23, 2016, provisional application No. 62/340,174, (Continued)

(30) Foreign Application Priority Data

Jul. 20, 2016  (GB) .................................. 1612591.6

(51) Int. Cl.
*H04L 29/12* (2006.01)
*H04L 12/749* (2013.01)
(Continued)

(52) U.S. Cl.
CPC ........ *H04L 61/1511* (2013.01); *G06F 16/955* (2019.01); *H04L 12/2803* (2013.01);
(Continued)

(58) Field of Classification Search
None
See application file for complete search history.

(56) References Cited

U.S. PATENT DOCUMENTS 6,594,260 B1    7/2003  Aviani, Jr. et al.
6,694,471 B1    2/2004  Sharp
(Continued)

FOREIGN PATENT DOCUMENTS

EP         2938046 A1    10/2015
WO    2016019041 A1     2/2016

OTHER PUBLICATIONS

Examination report dated Sep. 18, 2018 in application EP 17 733 135.2-1213 (10 Pages).
(Continued)

*Primary Examiner* — Esther B. Henderson
(74) *Attorney, Agent, or Firm* — Merchant & Gould P.C.

(57) ABSTRACT

A method for retrieving content on a network comprising a first device and a second device is described. The method includes receiving in the network a request for content from the first device, the request identifying the content using an IPv6 address for the content, and determining whether the content is stored in a cache of the second device. Upon determining the content is stored in the cache of the second device, a request is sent to the second device for the content using the IPv6 address of the content. The content is forwarded to the first device from the second device, wherein the first and second devices are part of the same layer 2 domain. Methods of injecting content to a home network and packaging content are also described.

20 Claims, 13 Drawing Sheets

Related U.S. Application Data filed on May 23, 2016, provisional application No. 62/340,166, filed on May 23, 2016, provisional application No. 62/340,162, filed on May 23, 2016, provisional application No. 62/340,182, filed on May 23, 2016, provisional application No. 62/324,727, filed on Apr. 19, 2016, provisional application No. 62/324,710, filed on Apr. 19, 2016, provisional application No. 62/324,696, filed on Apr. 19, 2016, provisional application No. 62/324,721, filed on Apr. 19, 2016, provisional application No. 62/324,657, filed on Apr. 19, 2016.

(51) Int. Cl.

| | | |
|---|---|---|
| *H04L 12/745* | (2013.01) | |
| *H04L 12/747* | (2013.01) | |
| *H04L 29/08* | (2006.01) | |
| *H04L 12/28* | (2006.01) | |
| *H04L 29/06* | (2006.01) | |
| *H04N 21/2343* | (2011.01) | |
| *H04N 21/658* | (2011.01) | |
| *H04N 21/643* | (2011.01) | |
| *H04N 21/845* | (2011.01) | |
| *H04L 12/723* | (2013.01) | |
| *G06F 16/955* | (2019.01) | |
| *H04L 12/721* | (2013.01) | |
| *H04L 12/725* | (2013.01) | |
| *H04N 21/262* | (2011.01) | |
| *H04L 12/743* | (2013.01) | |
| *H04L 12/26* | (2006.01) | |
| *H04L 12/741* | (2013.01) | |
| *H04N 21/2662* | (2011.01) | |

(52) U.S. Cl.
CPC .. *H04L 29/06163* (2013.01); *H04L 29/06517* (2013.01); *H04L 29/08045* (2013.01); *H04L 43/0876* (2013.01); *H04L 45/306* (2013.01); *H04L 45/34* (2013.01); *H04L 45/38* (2013.01); *H04L 45/50* (2013.01); *H04L 45/72* (2013.01); *H04L 45/741* (2013.01); *H04L 45/742* (2013.01); *H04L 45/745* (2013.01); *H04L 45/748* (2013.01); *H04L 45/7453* (2013.01); *H04L 45/7457* (2013.01); *H04L 61/103* (2013.01); *H04L 61/15* (2013.01); *H04L 61/1582* (2013.01); *H04L 61/2007* (2013.01); *H04L 61/251* (2013.01); *H04L 61/2503* (2013.01); *H04L 61/256* (2013.01); *H04L 61/304* (2013.01); *H04L 61/6059* (2013.01); *H04L 61/6063* (2013.01); *H04L 63/1416* (2013.01); *H04L 63/166* (2013.01); *H04L 63/168* (2013.01); *H04L 65/4084* (2013.01); *H04L 65/605* (2013.01); *H04L 65/608* (2013.01); *H04L 67/02* (2013.01); *H04L 67/1002* (2013.01); *H04L 67/1008* (2013.01); *H04L 67/2823* (2013.01); *H04L 67/2842* (2013.01); *H04L 67/322* (2013.01); *H04L 67/327* (2013.01); *H04L 69/22* (2013.01); *H04L 69/326* (2013.01); *H04N 21/23439* (2013.01); *H04N 21/26258* (2013.01); *H04N 21/64322* (2013.01); *H04N 21/6581* (2013.01); *H04N 21/845* (2013.01); *H04N 21/8456* (2013.01); *H04L 61/35* (2013.01); *H04L 65/4007* (2013.01); *H04L 65/602* (2013.01); *H04L 69/329* (2013.01); *H04L 2212/00* (2013.01); *H04N 21/2662* (2013.01)

(56) References Cited

U.S. PATENT DOCUMENTS

| | | | |
|---|---|---|---|
| 8,243,735 | B2 | 8/2012 | Jacobson et al. |
| 8,244,881 | B2 | 8/2012 | Thornton et al. |
| 8,260,881 | B1 | 9/2012 | Paleja et al. |
| 8,467,405 | B2 | 6/2013 | Suzuki |
| 8,549,167 | B2 | 10/2013 | Vonog et al. |
| 9,253,255 | B1 | 2/2016 | Bosch et al. |
| 9,372,778 | B1 * | 6/2016 | Duquene ............... G06F 16/176 |
| 9,712,412 | B2 | 7/2017 | Schlack et al. |
| 9,756,124 | B1 | 9/2017 | Bosch et al. |
| 9,832,291 | B2 | 11/2017 | Solis et al. |
| 9,871,722 | B2 | 1/2018 | Ou et al. |
| 9,948,550 | B2 | 4/2018 | Ge et al. |
| 9,948,557 | B2 | 4/2018 | Fan et al. |
| 9,960,999 | B2 | 5/2018 | Azgin et al. |
| 10,158,570 | B2 | 12/2018 | Moiseenko et al. |
| 10,313,415 | B2 | 6/2019 | Surcouf et al. |
| 10,404,537 | B2 | 9/2019 | Fox et al. |
| 10,440,161 | B2 | 10/2019 | Solis et al. |
| 2002/0116594 | A1 | 8/2002 | Cox |
| 2005/0182829 | A1 | 8/2005 | King et al. |
| 2006/0256817 | A1 | 11/2006 | Durst |
| 2008/0022051 | A1 * | 1/2008 | Osanai ............... G06F 12/0811 711/138 |
| 2009/0282159 | A1 * | 11/2009 | Wang .................... H04L 61/609 709/231 |
| 2009/0285209 | A1 | 11/2009 | Stewart et al. |
| 2009/0287835 | A1 | 11/2009 | Jacobson |
| 2009/0288163 | A1 | 11/2009 | Jacobson et al. |
| 2010/0061369 | A1 | 3/2010 | Suzuki |
| 2011/0252082 | A1 | 10/2011 | Cobb et al. |
| 2011/0280216 | A1 * | 11/2011 | Li ........................... H04L 12/14 370/331 |
| 2012/0331089 | A1 | 12/2012 | Vonog |
| 2013/0041972 | A1 | 2/2013 | Field et al. |
| 2013/0173822 | A1 | 7/2013 | Hong et al. |
| 2013/0227166 | A1 | 8/2013 | Ravindran et al. |
| 2013/0275544 | A1 | 10/2013 | Westphal |
| 2014/0023072 | A1 | 1/2014 | Lee et al. |
| 2014/0052812 | A1 * | 2/2014 | Ozawa ............... H04L 67/1095 709/213 |
| 2014/0082123 | A1 | 3/2014 | Hasuo |
| 2014/0289325 | A1 | 9/2014 | Solis |
| 2014/0310339 | A1 | 10/2014 | Yong et al. |
| 2015/0248455 | A1 | 9/2015 | Sevilla et al. |
| 2016/0021162 | A1 | 1/2016 | Surcouf |
| 2016/0036730 | A1 | 2/2016 | Kutscher et al. |
| 2016/0119251 | A1 | 4/2016 | Solis et al. |
| 2016/0234333 | A1 | 8/2016 | Yeh et al. |
| 2016/0308823 | A1 | 10/2016 | Maslak |
| 2016/0337426 | A1 | 11/2016 | Shribman et al. |
| 2017/0134274 | A1 | 5/2017 | Araújo |
| 2017/0201375 | A1 | 7/2017 | Amin et al. |
| 2017/0277909 | A1 | 9/2017 | Kraemer et al. |
| 2017/0302552 | A1 | 10/2017 | Ward et al. |
| 2017/0302575 | A1 | 10/2017 | Ward et al. |
| 2017/0302576 | A1 | 10/2017 | Townsley et al. |
| 2017/0346788 | A1 | 11/2017 | Jokela et al. |
| 2018/0103128 | A1 | 4/2018 | Muscariello et al. |
| 2018/0241669 | A1 | 8/2018 | Muscariello et al. |
| 2018/0241679 | A1 | 8/2018 | Muscariello et al. |
| 2018/0242186 | A1 | 8/2018 | Muscariello et al. |
| 2018/0824221 | | 8/2018 | Muscariello et al. |
| 2018/0367651 | A1 | 12/2018 | Li et al. |
| 2019/0222619 | A1 | 7/2019 | Shribman et al. |

OTHER PUBLICATIONS

Examination report dated Mar. 16, 2020 in application EP 17 733 142.8-1213 (11 pages).

Examination report dated Mar. 16, 2020 in application EP 17 733 1.134.5-1213 (11 Pages).

Suman Srinivasan et al. "IPv6 Addresses as Content Names in Information-Centric Network", Jun. 18, 2011 (Jun. 18, 2011), pp.

(56) References Cited

OTHER PUBLICATIONS 1-2, XP055404410, Columbia University, Retrieved from the Internet: URL:http://www.cs.columbia.edu/~hgs/papers/Srin1106_1Pv6.pdf.

Brian Field et al. "Integrating Routing with Content Delivery Networks", Computer Communciations Workshops (INFOCOM WKSHPS), 2012 IEEE Conference On, IEEE, Mar. 25, 2012 (Mar. 25, 2012), pp. 292-297, XP032175746, DOI: 10.1109/INFOCOMW.2012.6193508; ISBN: 978-1-4673-1016-1 (6 pages).

Abhishek Chanda et al. "ContentFLow: Adding Content Primitives to Software Defined Networks", Globecom 2013-Next Generation Networking Symposium; 978-1-4799-1353-4 (7 PAGES).

C. Westphal et al. "Adaptive Video Streaming over ICN", Internet Draft, draft-irtf-icnrg-videostreaming-07, Feb. 16, 2016, 40 pages.

\* cited by examiner

301

32 bit Label assigned to a device

Fig. 3

Massively Distributed In-Network Caching

Augment existing CDN nodes with 6CN capability (Cisco OMD, ATS, nginx)

Develop Container-based micro-service content delivery, extend caching and streaming deep into SP network.

Cache anywhere a container can run and IPv6 can reach, including in the home (OpenWRT/RDK, OpenCPE)

CONTENT DELIVERY FROM HOME NETWORKS

RELATED APPLICATIONS

This application claims the benefit under provisions of 35 U.S.C. § 119(e) of Provisional U.S. Application No. 62/340,166 filed May 23, 2016, Provisional U.S. Application No. 62/324,710 filed Apr. 19, 2016, Provisional Application No. 62/324,696 filed Apr. 19, 2016, Provisional Application No. 62/324,657 filed Apr. 19, 2016, Provisional Application No. 62/324,727 filed Apr. 19, 2016, Provisional Application No. 62/324,721 filed Apr. 19, 2016, Provisional Application No. 62/340,156 filed May 23, 2016, Provisional Application No. 62/340,182 filed May 23, 2016, Provisional Application No. 62/340,162 filed May 23, 2016, and Provisional Application No. 62/340,174 filed May 23, 2016, in which the respective disclosure of each is hereby incorporated herein by reference in its entirety. This application also claims priority to United Kingdom Patent Application No. 1612591.6 filed Jul. 20, 2016, the disclosure of which is hereby incorporated herein by reference in its entirety.

TECHNICAL FIELD

The present disclosure relates generally to content retrieval in an IPv6 network, in particular content retrieval other devices in local or home networks.

BACKGROUND

In a traditional IP network, addressing schemes have been established based on the nodes of the network such that individual network nodes have associated local or globally-unique addresses. The use of such addressing schemes leads to content being requested and returned to individual network nodes.

BRIEF DESCRIPTION OF THE FIGURES

Embodiments of the method and apparatus described herein are illustrated in the Figures in which:

FIG. 3 shows a representation of an IPv4 header;

DETAILED DESCRIPTION

Overview

Figure 1:
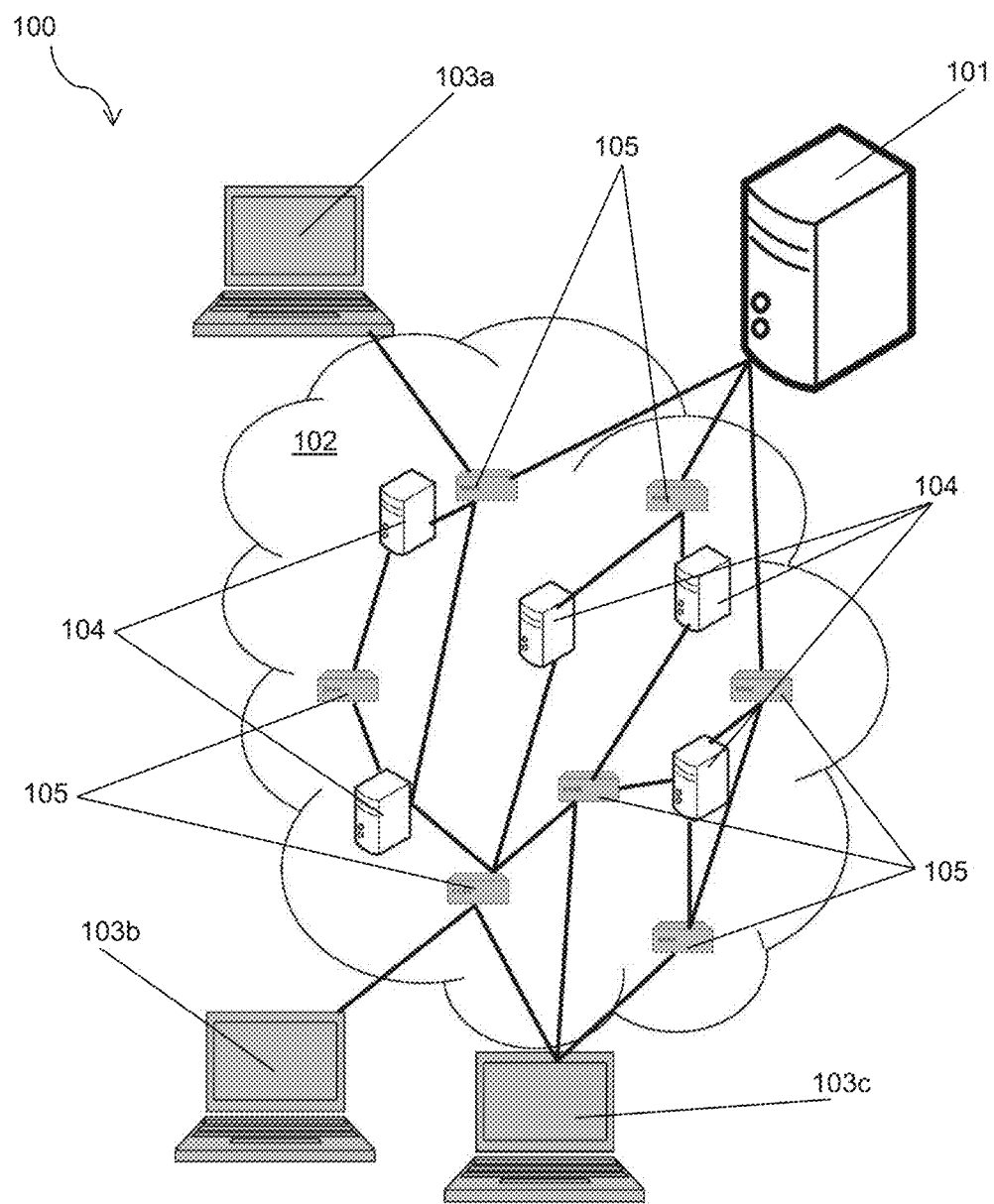
FIG. 1 shows an overview of a network in which embodiments may be implemented.

Described herein is a method for retrieving content on a network comprising a first device and a second device. The method includes receiving in the network a request for content from the first device, the request identifying the content using an IPv6 address for the content, and determining whether the content is stored in a cache of the second device. Upon determining the content is stored in the cache of the second device, a request is sent to the second device for the content using the IPv6 address of the content. The content is forwarded to the first device from the second device, wherein the first and second devices are part of the same layer 2 domain.

There is also described herein a method for injecting content to a home network The method includes sending content to a router in a home network for storing in the home network, wherein the content has an associated IPv6 address, the IPv6 address comprising an identifier of the content. The content is then stored in a storage device in the home network and a route is advertised to the IPv6 address of the content stored in the storage device.

There is also described herein a method of packaging content including receiving content in a home network and generating at least one content package from the received content. Each content package comprises an IPv6 address having a first part comprising a prefix identifying the home network and a second part comprising an identifier of the content.

Apparatus for implementing the method, including network nodes, computer programs, computer program products, computer readable media and logic encoded on tangible media for implementing the method are also described.

In particular, an apparatus for retrieving content on a network comprising a first device and a second device is described. The apparatus includes a processor configured to receive in the network a request for content from the first device, the request identifying the content using an IPv6 address for the content. The processor determines whether the content is stored in a cache of the second device and, upon determining the content is stored in the cache of the second device, sends a request to the second device for the content using the IPv6 address of the content. The processor is further configured to forward the content to the first device from the second device.

An apparatus for injecting content to a home network is also described. The apparatus includes a processor configured to send content to a router in a home network for storing in the home network, wherein the content has an associated IPv6 address, the IPv6 address comprising an identifier of the content. The processor further stores the content in a storage device in the home network and advertises a route to the IPv6 address of the content stored in the storage device.

Also described is an apparatus for packaging content, the apparatus comprising a processor configured to receive content in a home network. The processor is further configured to generate at least one content package from the received content wherein each content package comprises an IPv6 address having a first part comprising a prefix identifying the home network and a second part comprising an identifier of the content.

EXAMPLE EMBODIMENTS

Networks such as local area networks and wide area networks can be implemented between nodes or network devices and are often utilised for distributing data for storage within the network device and for later retrieval of that data. One example of a wide area network is the internet. Nodes of the network may request data from one another. They can do this in one of two ways they can either address a request to another node, the request including details of the data being requested, or they can address a request directly to the required data.

The network forming the internet is made up of a large number of interconnected nodes. These nodes include clients, switches, servers, routers and other such devices and the nodes can communicate using many different protocols at different layers of the OSI model, but in particular the Internet Protocol version 4 (IPv4) communications protocol. Nodes in the network can be addressed using static or dynamic IPv4 addresses, some of which are globally-reachable but many of which are specific to a local network segment.

Internet Protocol version 6 (IPv6) has greatly increased the number of available Internet Protocol (IP) addresses, enabling IP addresses to be utilised in a different way. IPv6 addresses contain 128 bits and the number of unique IPv6 addresses is therefore significantly greater than for 32-bit IPv4 addresses. This means that content, in addition to nodes, can have an IP address; in fact each data item, whether it is a page, article or piece of multimedia content can have its own IP address. This means that rather than traffic being addressed to a specific node, traffic can now be alternatively or additionally addressed to a particular piece of content.

FIG. 1 shows a standard network configuration 100 with clients (or consumers, or users) 103a-c, a main server 101, routers 105 and caches 104. Note that identical numbering has been used for features which are functionally equivalent to one another, e.g. all the caches 104, and all the routers 105. This should be interpreted as meaning that each cache has broadly the same functionality as each other cache, although the exact content stored on each, and the technical capabilities of each may vary. Similarly, each router 105 is arranged to operate in broadly the same way as each other router, and importantly they are all interoperable with each other, but specific functioning and capabilities may vary between routers.

Figure 2:
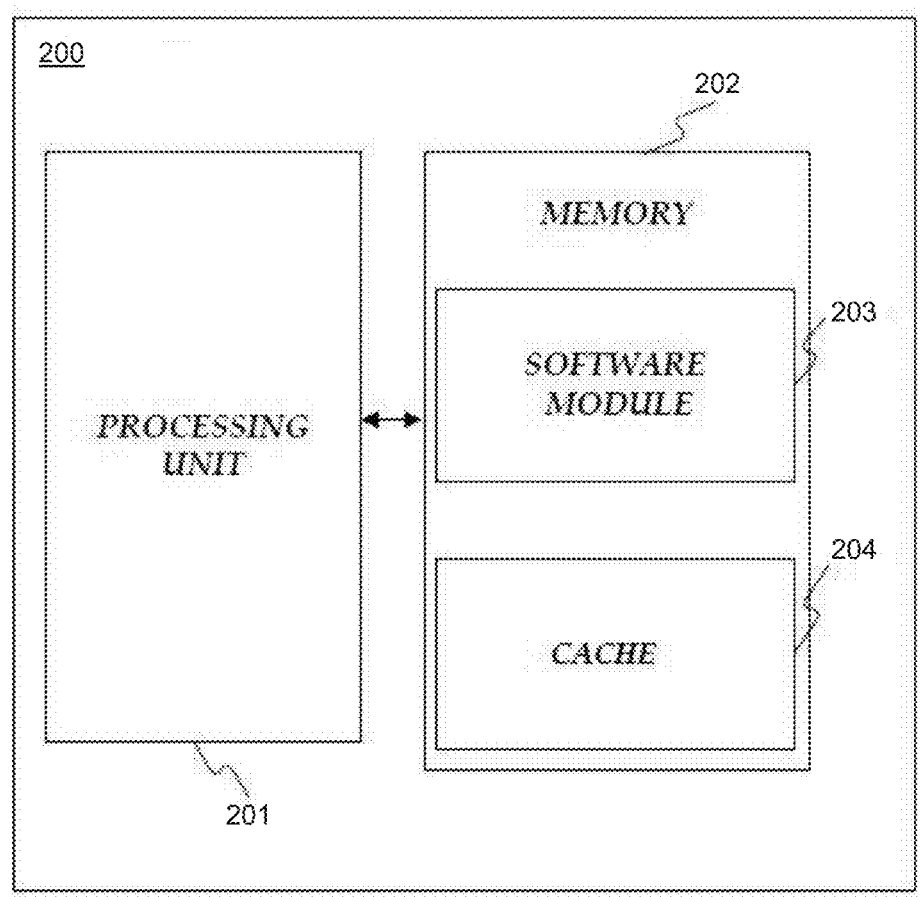
FIG. 2 shows a block diagram representative of a router or server.

FIG. 2 shows a block diagram of a server. The server has within it a cache memory that is used to store content that can be accessed by other nodes on the network. This memory is assigned by several algorithms, most commonly the content most recently requested by one of the end point nodes is stored. FIG. 1 shows these endpoint nodes, which can receive data from a number of servers. If an end point node requests content the server will check its cache to see if it has the content stored; if it does not, it will redirect the request to another node. For example it may redirect the request to a central node that is the provider of the content.

In particular, FIG. 1 shows clients 103a-c and illustrates how they can receive data over a network 102, which could be the internet, for example. A request from a client 103 is forwarded to a cache 104, based on known routing policies. If the cache 104 does not have the exact content requested, it can either redirect the request to another node, for example it may redirect the request to a main server 101 that is the provider of the content.

Typically, routing is performed using Internet Protocol (IP) addresses. The IP version currently in use is IPv4, which uses 32 bits to provide a unique address to every node on a network. This provides a little over 4 billion addresses, and it has been recognised for some time that the rate of growth of the internet is quickly rendering this number inadequate. To solve this problem, a new version of the Internet Protocol has been developed. This new version, IPv6, uses 128 bit addresses, allowing a total of around $3.4 \times 10^{38}$ addresses.

A server usually serves a plurality of endpoint nodes across the network as is shown in FIG. 1. This means that the server may have to deal with multiple requests at the same time. If these requests together ask for more resources than the server or network (e.g. network bandwidth) can provide, then load balancing may be required. Load balancing is where traffic from nodes is redirected and distributed across a group of servers so that the requests can be fulfilled. It may also be the case that the requests cannot be fulfilled. For example many nodes may request a high quality of multimedia content and it may not be possible to deliver this simultaneously to all of the nodes. Therefore an inferior level of content may be delivered to at least some of the nodes in order not to overload the network but nevertheless still transmit the content (albeit at a lower quality than requested) to the nodes.

IPv6

IPv6 is an updated version of the internet protocol and is intended to replace IPv4. IPv4 and IPv6 are not designed to be interoperable. IPv6 uses a 128 bit address and these addresses are represented by eight groups of four hexadecimal digits.

IPv6 networks provide auto-configuration capabilities, enabling automatic assignment of an IP address to a device for example based on the device's Media Access Control (MAC) address. IPv6 networks are simpler, flatter and more manageable, especially for large installations. Direct addressing of nodes from anywhere in the network is possible due to the vast IPv6 address space, which enable the use of globally-unique addresses, and the need for network address translation (NAT) devices is effectively eliminated.

An IPv6 address is designed to consist of two parts, a 64 bit prefix that is used for routing and a 64 bit interface identifier. The interface identifier was originally designed to identify a host's network interface, for example by using a hardware address such as the MAC address of the interface. However it has been appreciated that the interface identifier does not have to be used for this purpose. To this end some embodiments described herein utilise the interface identifier to identify content instead. Therefore content will have its own IP address. This means that instead of routing to a particular node in the network, traffic will route to specific content. Large data files such as streams of media content, are often divided into chunks or segments of data as described below and, in this case, each chunk will preferably have its own address.

Figure 4A:
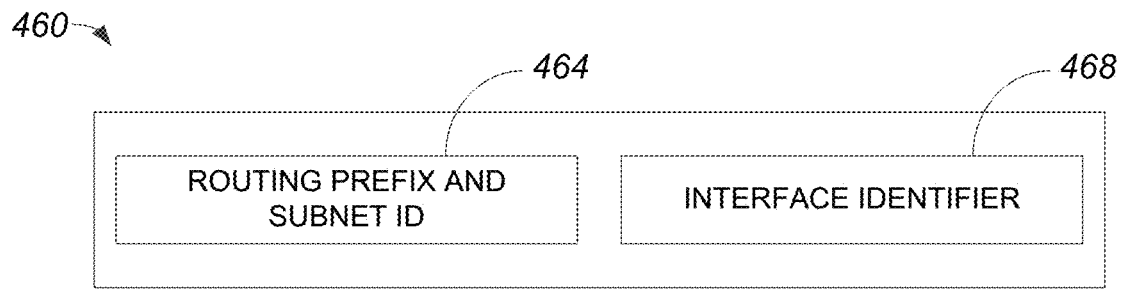
FIGS. 4A and 4B show diagrammatic representations of an IPv6 address in accordance with several embodiments.

FIG. 4A is a diagrammatic representation of an IPv6 address that may be part of a segment list in a segment routing header in accordance with an embodiment. An IPv6 address 460 may include bits, e.g., 128 bits, substantially divided into a routing prefix and subnet identifier (ID) 464 and an interface identifier 468. In one embodiment, routing prefix and subnet ID 464 includes approximately 64-bits, and interface identifier 468 includes approximately 64-bits.

An overall content description may be included in, e.g., coded in, interface identifier 468.

Interface identifier 468 will be described with respect to FIG. 4B in accordance with an embodiment. Interface identifier 468 may include, as shown, a stream type 470a, a service identifier (ID) 470b, a content descriptor 470c, and a chunk descriptor 470d. It should be appreciated that the number of bits included in interface identifier 468 may vary widely, and the number of bits allocated to stream type 470a, service ID 470b, content descriptor 479c, and chunk descriptor 470d may also vary widely, By way of example, interface identifier 468 may include approximately 64-bits, while stream type 470a may include 2-bits, service ID 470b may include 12-bits, content descriptor 470c may include 26-bits, and chunk descriptor 470d may include 24-bits.

Stream type 470a may describe a type of stream, e.g., a type of video stream. Types of streams may generally include, but are not limited to including, linear content such as television or live video content, non-linear content such as video-on-demand, user generated content (UGC), and corporate audio/visual content such as telepresence content.

Service ID 470b may identify service from any source, as for example a provider, an operator, and/or a channel. It should be understood that each source may generally have more than one service ID 470b. In one embodiment, when service ID 470b includes 12-bits, there may be up to approximately 4096 values for service ID 470b that correspond to each stream type 470a.

Content descriptor 470c may generally allow for the management and the identification of content associated with each value of service ID 470b. Examples of a suitable content descriptor 470c will be discussed below with respect to FIGS. 5A-C.

Chunk descriptor 470d is arranged to describe naming conventions for segments which make up, e.g., constitute, content such as a chunk of video. As will be understood by those skilled in the art, chunk descriptor 470d describes naming conventions for segments which make up content. In general, chunk descriptor 470d also facilitates the implementation of caching strategies such as automatic predictive caching. Chunk descriptor 470d may have approximately the same structure as content descriptor 470c, although chunk descriptor 470d and content descriptor 470c generally include different, substantially independent, information. One example of a suitable content descriptor 470c will be described below with reference to FIG. 6.

Figure 5A:
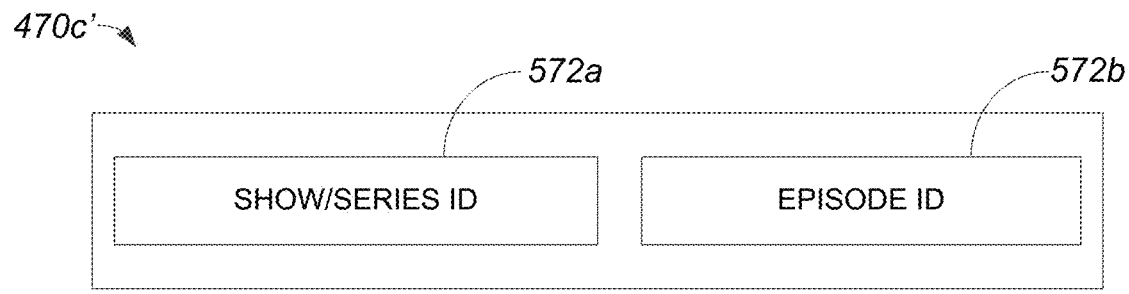
FIGS. 5A-C show diagrammatic representations of suitable content descriptions in accordance with embodiments of the present disclosure.
Figure 5B:
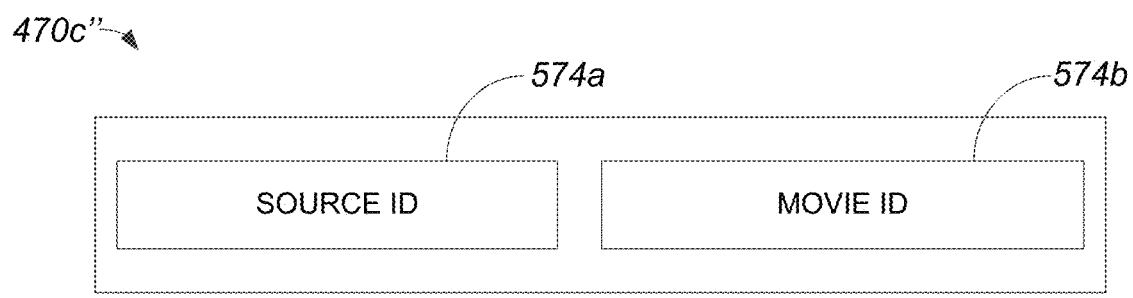
Figure 5C:
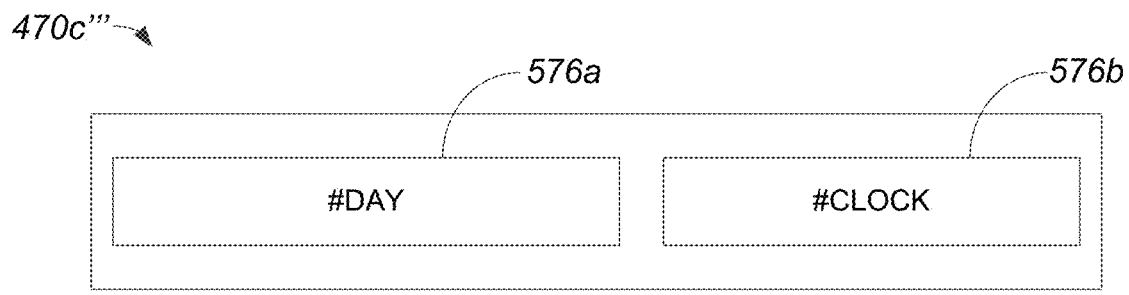

Referring next to FIGS. 5A-C, examples of suitable content descriptors 470c will be described. Using IPv6 address bits as a content descriptor effectively exposes significant properties of content to lower level layers of a network, and may also facilitate the implementation of caching strategies such as automatic predictive caching.

Figure 4B:
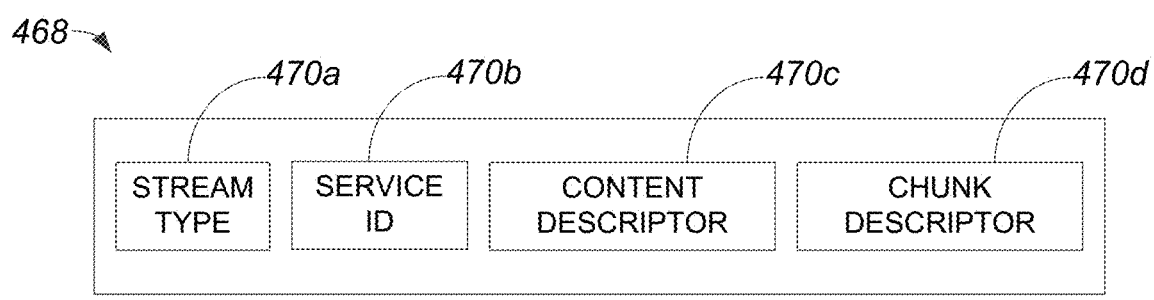

FIG. 5A is a diagrammatic representation of a first suitable content description, e.g., content descriptor 470c' of FIG. 4B, in accordance with an embodiment. When content is associated with shows or series associated with a service or channel ID, bits of a first content descriptor 470c' may include a show or series identifier (ID) 572a and an episode ID 572b. The number of bits associated with show or series ID 572a and episode ID 572b may vary widely. In one embodiment, show or series ID 572a may include approximately 16-bits and episode ID 572b may include approximately 10-bits.

When content is associated with movies, a content descriptor 470c" may include a source identifier (ID) 574a and a movie identifier (ID) 574b, as shown in FIG. 5B. In one embodiment, source ID 574 may include approximately 12-bits and movie ID may include approximately 14-bits.

FIG. 5C is a diagrammatic representation of a third suitable content descriptor in accordance with an embodiment. A content descriptor 470c'" may be suitable for managing a flow per minute in a day. Content descriptor 470c'" may include a # day 576a and a # clock 576b. # day 576a identifies a number of days starting from a fixed date, e.g., a conventional fixed date, and # clock 576b identifies a time. In the described embodiment, # day 576a includes approximately 15-bits and # clock 576b includes approximately 11-bits. As # day 576a generally identifies a number of days starting from a fixed date, # day 576a effectively enables an actual date to be determined.

Mapping Database

One node (or distributed system) that may be provided in networks described herein is a mapping database, such as a Domain Name System, DNS. The DNS is a decentralised naming system for nodes connected to the internet. It is used to associate URLs or domain names with IPv4 addresses. DNS can be implemented to work the same way with IPv6, however now it can also associate content, or a combination of content name and URL with an IPv6 address.

The skilled person will appreciate, however, that other mapping databases may be used to implement the methods described herein. A mapping database will typically map a device or content identifier (which may be a text-based identifier of the device or content such as a URL) to an address identifiable in a network (typically a numerical address for the device or content, such as an IPv4 or IPv6 address). As described herein, the address returned by the mapping database may uniquely identify the location of the device or content or may point towards the device or content location (for example, as in segment routing). The address returned may therefore be a complete address associated with the content or device or may be a partial address, such as an IP address including a number of default generic fields.

Segment Routing

One way of requesting content in an IPv6 network is to use segment routing. Segment Routing (SR) allows an IPv6 or Multiprotocol Label Switching (MPLS) packet header to encode a list of explicit waypoints, e.g., multiple nodes, rather than a single destination. Such waypoints may be used to route packets through a specific service or application. Accessing a particular service hosted on any one of a list of servers, however, is time-consuming and inefficient.

Common content streaming systems typically utilize web protocols, as for example a hypertext transport protocol (HTTP), that operates at substantially all application layers. As common content streaming systems rely on Domain Name Service (DNS) and HTTP, Transmission Control Protocol (TCP), and/or Internet Protocol (IP), technical tradeoffs and limitations may result in compromising the quality of streaming content. Common content streaming systems include, but are not limited to including, video streaming systems and audio streaming systems.

Segment Routing (SR) protocol architectures generally provide a tool to help search for content among multiple nodes or networks. In conjunction with the data-centric networking methods described herein, SR allows a shift from substantially centralized delivery of streaming video and single-point fetching to a data-centric object fetch approach at an inter-networking layer. As a result, more efficient streaming systems may be designed.

The general concept of Segment Routing is to allow a set of waypoints to be defined, and as a request traverses the network, a specific function is implemented at that waypoint. To give a specific example, a segment routing request may comprise a series of addresses, and the packet traverses the network, arriving at each address in order (in contrast to the usual shortest, or lowest latency route). One of the addresses may be an address for fetching the requested piece of content, and this is the final destination (e.g. the final address may be an address directly to content, as described herein). Other addresses specify waypoints along the route, at which various functions may be applied, for example service based or topological instructions. Thus Segment Routing v6 enables multiple functions one of which is hunting for directly addressed content.

When SR is used to enable content stored on servers to be provided to a client, a search for a suitable place to open a connection is conducted, and then a connection may be opened at that place so that a network may handle the process of accessing the content.

SR allows an IPv6 or Multiprotocol Label Switching (MPLS) packet header to encode a list of explicit waypoints, e.g., SR nodes, rather than a single destination. Such waypoints or SR nodes may be used to route packets through a specific service or application. For example, SR may route packets to or through a specific aspect of an application and/or a service as long as that specific aspect may be uniquely numbered and represented by an explicit waypoint such as an SR node. An aspect may be, but is not limited to being, a uniquely identifiable chunk of data in a content caching or video delivery application.

Some systems allow IPv6 SR to be used to search for or otherwise hunt for a particular piece of content or service which may reside on substantially any SR-capable waypoint or node running an application that will provide the piece of content or service. Such systems typically rely upon the ability of an SR-capable node to intercept a packet at an intermediate waypoint during a session on the way to a final destination in an SR list. In addition, subsequent packets may reach the same intermediate waypoint without being intercepted by any other waypoints for the life of the session.

In one embodiment, a new mechanism that enables a client to access a service hosted on a list of servers referenced in an SR list is provided. In another embodiment, servers are substantially auto-selected without a client noticing which server has accepted a connection request. SR is used to allow a server selection process to be more automatic and transparent to a client or an endpoint requesting a service.

Specific IPv6 addresses are searched for, or hunted for, along a path of specified IPv6 addresses in an SR list. When a match is found to a specific IP address, the match may correspond to either an application that will result in an instantiation of a new TCP session on a particular node from the SR list, or may be associated with an already existing TCP session. An initial TCP packet may have a different SR list than a subsequent reply and packets thereafter. The ability to direct traffic to a node with a TCP session may be provided in a way that does not require modifications to existing TCP stacks. An IPv6 stack may provide proper primitives to essentially support load balancing of a stateful session such as a TCP session across a set of nodes as defined by an IPv6 SR list. In this example, TCP is an example of a suitable protocol. There are many other connection oriented transport protocols that could be used in place of the commonly used TCP.

A node in the system may be configured to send a packet with a segment routing header populated with the list of addresses attached to the chunk entry from the video description. The packet then goes along the path set by all these segments, and if at any point in the path one of the routers (network endpoints) has the requested chunk, it can terminate the traffic and send the chunk back to the client device. The router therefore may be able to intercept and interpret the packet to detect whether or not it has the requested chunk.

The router may maintain an additional table that represents the "chunk table". When a packet as described above arrives, the router performs a lookup on the chunk table with the last address from the SR list. If there is a match meaning that the chunk is present, the router can terminate the traffic and sends the chunk back to the client. Otherwise, it sends the packet to the next segment in the list. It is not mandatory for a router having the requested chunk to terminate the traffic, this decision can be driven be other considerations such as current workload or other network considerations.

IPv6 SR may also be used for building path-aware geo-location into the routing system. This may allow routers to serve content based on where the content lies, and where the paths content traverses, with the ability to reroute dynamically while including crossing of political and geographical boundaries intact.

Storage and Retrieval of Media Content in a Network

Media content (both audio and video) can be divided into chunks or segments for both storage in and delivery over a network. In that way, for example, media content that can be of many hours duration (such as a film or broadcast of a sporting event) can be divided into a number of segments of shorter playback time (such as between 30 seconds and 5 minutes).

When a network device, such as a client end user device, requests particular media content, such as a particular video file, it may obtain all of the chunks of data that make up that media content.

One way of streaming media content using chunking is to use a technique such as Dynamic Adaptive Streaming over HTTP (DASH), which allows adaptive bit rate streaming of media content, stored as chunks in a network one or more HTTP servers, to a network destination requesting the data.

Prior to storage, the media content is divided into shorter chunks or segments and alternative versions of each chunk are stored at various servers in the network. The alternative versions may be, for example, encoded at different bit rates or may have different formats for playback through a variety of different end user devices (Internet connected TVs, set top boxes, mobile devices including smartphones, laptops etc.)

When the content chunks are created, a DASH manifest file is also created, which identifies the chunks of data necessary to recreate the whole stream of media content, including details of alternative chunks (for example those that are encoded at different bit rates).

Separate DASH manifest files may be created for different formats or encodings of a particular stream of media content, such that a set top box would be working from a different DASH manifest to that used by a smartphone.

The DASH manifest typically also includes an indication of the location of each of the chunks. However, when dealing with consecutive or aggregate chunks, a manifest template can be used to group multiple chunks that follow a regular format into one description. This can enable easier parsing of the manifest file.

Based on the manifest, the end user device can retrieve and reconstruct the full media content at the highest bit rate currently available to it over the network. In particular, the end user device can obtain subsequent chunks identified in the manifest while decoding and displaying a current chunk.

OTT+P2P

Figure 6:
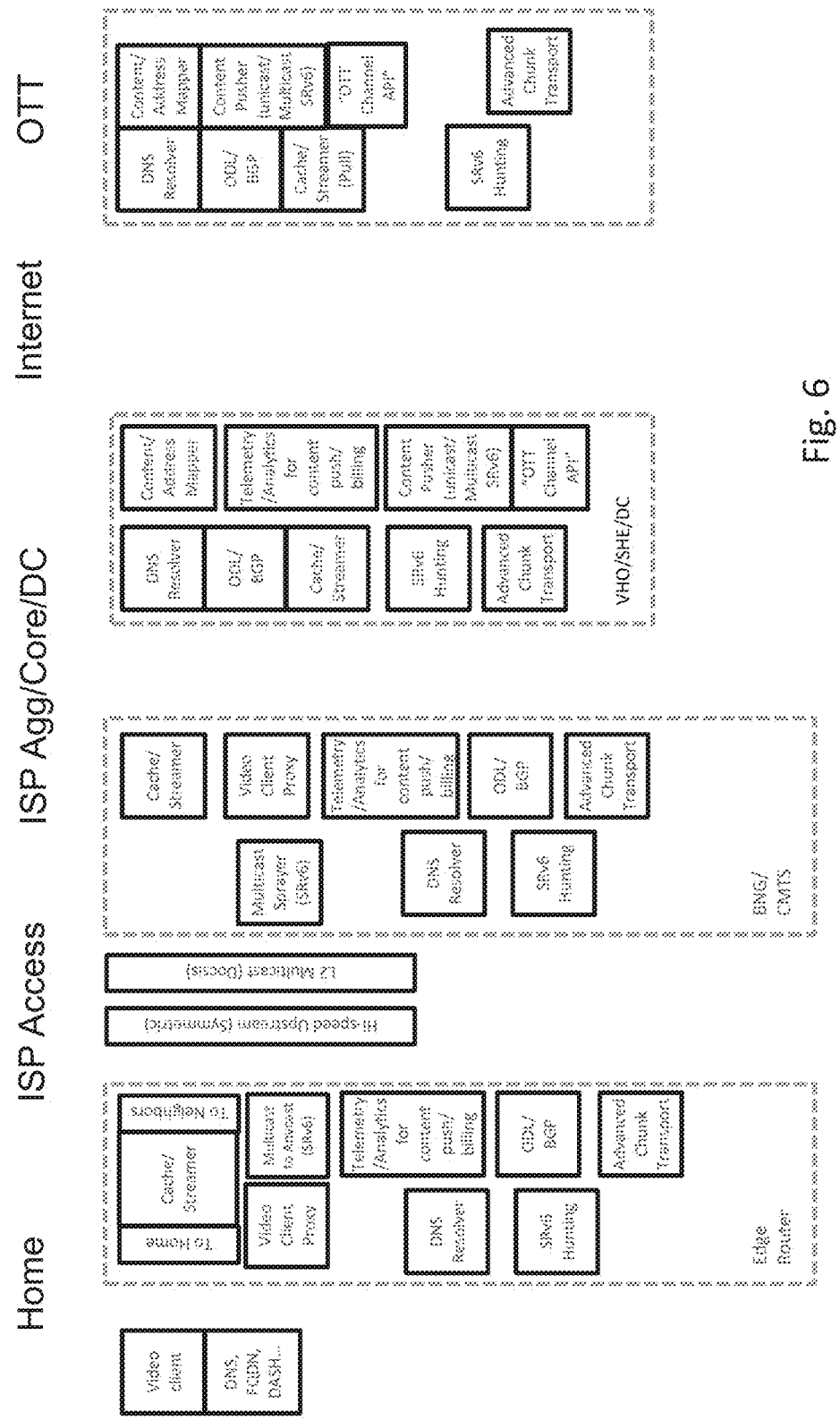
FIG. 6 shows a schematic for content delivery over the network.

FIG. 6 shows an example of an IPv6 enabled network, in which a user in a home receives content over the network from an OTT provider. While the figure shows an OTT provider as the origin of the content, the general principles described herein relate to the provision of content from any server on the network.

Briefly, the content provider supplies content via a network. In this example, the internet is used to distribute the content, but in other examples, any network may be used for content delivery. The content is then transmitted around the network by an internet service provider (ISP). Once the content is on the ISP at large, it can be delivered to consumers in the manner described in detail herein.

In particular, the final stage of the network prior to delivery to a user is an edge router. Once the user has requested data, it propagates through the network, to the edge router, which is usually the closest router of the network (geographically or topologically) to the location of the user. The edge router is typically tasked with authentication of both user and network content.

A particular feature of note is the portion of the edge router which connects to neighbours. For example, the edge router may link to other routers in the neighbourhood, or other geographically close vicinity, either as part of the network, or even in other homes. In this way content previously delivered to other network nodes can be supplied to a user very quickly, since it need not travel a large distance, so is less prone to the slowing effect of network traffic.

This arrangement is similar to existing Peer-to-Peer (P2P) networking models. A key difference is the use of direct content addressing to determine the data stored at any given node. While P2P uses its own naming system, and each data chunk is only identifiable to specific users, the IPv6 model described herein allows any user to quickly and easily request, identify and obtain information over such a network.

Another possibility is that the network is deliberately designed to incorporate some degree of JIT transcoding. In this case, nodes would advertise more content than they strictly have available, by advertising all variants of a particular piece of content (or even a chunk). As described herein, the nodes are able to deliver the variants of the content by transcoding from a mezzanine file. The exact details of the network routing prior to the request reaching a node may be varied by a network operator, depending on their requirements.

Figure 3:
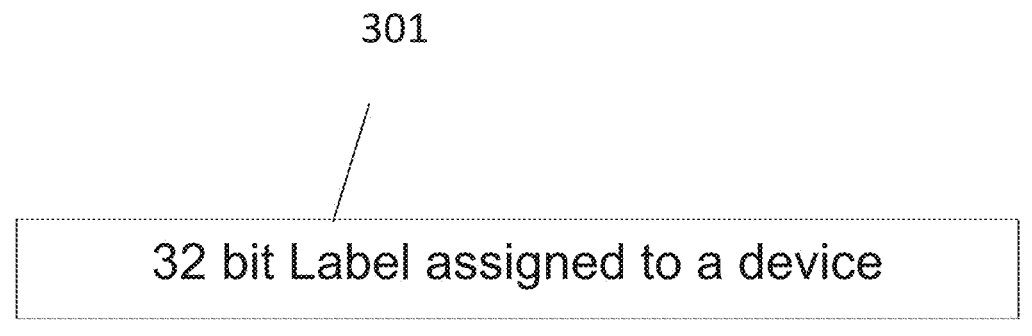

Comparing FIGS. 3A and 3B, it can be seen that portions 306a and 306b do not match. Typically, the matching process uses a longest prefix match. This works by starting at the beginning of two addresses, and proceeding until a point is reached where the two addresses do not match. In the example of FIGS. 3A and 3B, the portions 306a and 306b do not match. In this example, the node interprets this as the client request 300a being directed towards a piece of content which is stored in the cache, but for a variant which is not stored in the cache.

However, since the structure of the addressing system allows the system to understand the nature of the content which is requested directly from the requested address, it is possible to create content to satisfy a request, even if that particular variant is not stored in the node cache.

One way to do this is to store a mezzanine file 300c at each node. This could be designated by filling in the content identifier 305 (e.g. the file name, title etc.) to identify the content, but leaving substantially all of the other bits set to zero. It is then very easy for the node to direct any request for which it does not have matching content directly to the mezzanine file.

In any event, the request is received by a cache of the network. By performing a longest prefix match, it is easy to determine how similar the content of the request is to content stored at the cache. Obviously in the case of an exact match, the solution is simple; the cache must simply return the content to the client. In the case where a match is not exact, for example, compare FIGS. 3A and 3B, it can nevertheless be clear to the node that the request relates to a chunk that the node possesses, but in a different variant.

In a particular variant, each node can be supplied with a mezzanine file for each piece of content. By default, the mezzanine file could be addressed by setting substantially all the variant bits to zero, for example, as shown in FIG. 3C. When the node identifies a partial match, for example when the node matches the file name, but one or more of the variant bits of the request do not match the address of any of the content stored at that node, then the node can redirect the request to the mezzanine file. In this way, the content can be served, even if it is not in the exact format requested by the client.

While this is the simplest implementation, the use of IPv6 addresses allows for a great degree of subtlety and control in how a network processes requests and delivers content. For example, instead of linking to a mezzanine file, and delivering the content directly, the linking to the mezzanine file could instead start a workload. Once the node has identified a partial match, examination of the address of the request will tell the node what content the client would like (specifying file format, video resolution, audio encoding, language options, subtitles, etc.).

When the request is rerouted to the mezzanine file, the node can initiate processing, using the request as an input. The processing initiated by the node beings the process of transcoding the mezzanine file into the requested format. Once this transcoding is complete, the requested variant of the content can be packaged and sent to the client. Since the request forms an input to the transcoding operation, the generated content is guaranteed to match the request.

It is important to package the data before it is sent to the client to ensure that the content is correctly deliverable to the client. While this is already performed by content providers, the inclusion of an address directly to the content (e.g. an IPv6 address) is beneficial to the network in implementing the various routing and caching policies required of it. Indeed, packaging helps to ensure that the content acquires the correct address, according to the addressing rules being operated by the node. Packaging enables the content creation and distribution to be carried out with the IP network in mind. The content can be packaged as a whole, or as individual chunks. Encapsulation of the content with an IPv6 header to identify the content prior to sending it to the client allows for efficient routing and delivery of content over an IPv6 network.

A workload created in this way can be a multiple workload in the present system. That is to say, many network locations (e.g. caches) could receive the request simultaneously, and start to generate content. This may be designed onto the network, to force seeds to be cached at distributed locations, or it may be triggered only when a particular piece of content or chunk of content has been determined to be particularly popular. In this way, several seeds could be created for the same missing content, and multiple caches can be populated with the content, e.g. for future use.

Since the workload is triggered as soon as the node receives a client request, the workload can also internally perform a longest prefix match between the address of the client request and the content it has stored locally, for example to select a best start point (that is, input data) to minimise the computation required to generate the requested content. In the manner described above, a fully distribute JIT transcoding and packaging system is intimately (since each node is configured to perform JIT) and transparently (due to direct addressing of content) integrated into the network.

Note that the use of IPv6 addresses to denote specific data (either entire files, or chunks thereof) allows the network to check whether it has the data very quickly. It is also very quick for the network to determine what the client is asking for, and provide this by transcoding, if necessary prior to packaging and sending the content to the client.

Now that the requested variant of the content has been created and delivered to the client, the system can make a decision as to whether to keep a copy of this content in the cache, or delete it. Once more this is a choice for specific network operators to make, depending on their requirements, but it is likely that a factor in the decision making process will be how likely it is that the same content variant will be requested in the future.

For example, a cache may decide to delete content to free up space for more frequently requested content. This is a valid choice, since a network having JIT as a fundamental part of its policy can always create content as requested, on the fly so long as it can access a corresponding mezzanine file. In this way, each network node can load balance between computation and storage resources, thus improving the network overall.

If a decision is made to store the content variant in the cache, this may be stored indefinitely. That is, stored until the cache is full, at which point a new instruction to write to the cache causes e.g. the least used content to be overwritten. Alternatively, the content can be written to the cache, and time to live (TTL) can be used to specify how long the data remains stored in the cache. In any event, while the content is stored in the cache, the node can advertise that it holds this content variant.

When a request for that content variant next propagates the network, the network knows to forward the request to that particular node. If the forwarding is based on out of date advertisements, it is possible that the TTL has expired, and the content variant has been deleted, in which case the node can be instructed to generate the content again. Of course, if the TTL has not expired, and the content remains on the node, the content can be supplied to the client very quickly. In this case, a second request for the same content can reset, the TTL timer, or even extend it beyond its initial value in recognition of the popularity of the content variant in question. In addition to advertising the presence of the content variant on a node or cache, the advertisement can also include an advertisement of the TTL.

In other words the newly created variant becomes a cache entry managed as any other cache entries. The above descriptions are just examples but any more elaborated cache policy can also apply.

The cache can be responsive to more than just client requests for content. For example, since the purpose of CDNs is to store popular content in a distributed manner, to reduce the time taken to acquire that content, the network can be configured to recognise that certain content and/or content variants are highly popular. Upon identifying a particular content variant as popular, the content variant created by a node can be propagated through the network to form a distributed set of cached content variants. This propagation can be achieved by caches requesting content from other caches directly.

As set out above, such a system allows full integration of JIT Transcoding functionality in a distributed CDN system. This results in an improved management of resources. It also greatly simplifies global CDN management since, instead of relying on complex CDN application logic, this system allows the network to trigger content JIT transcoding. In previous networks, the only way of triggering a JIT event would be for a failed series of routing requests to force the CDN to generate the content as a last resort. This is because, as has been explained, JIT can be hard to correctly manage and implement in other networks, so there has typically been a drive to use JIT only rarely, for example when it is the last chance for the network to deliver the content, rather than deliver a failure notification.

Coupling embodiments of this system to network telemetry also allows the network to make better "what to keep in cache" decisions, thus contributing to better CDN resources usage.

Note that improved network telemetry is possible by using IPv6 addresses in the manner described above, because now the network knows not just how much data is flowing between which endpoints, but it knows exactly what that data is. The network has information readily available on exactly which pieces of content are popular, where in the world they are popular, which device types are requesting the content, and in what format, all from the addresses being used. This allows the network to intelligently populate its caches, using address information of content which it is already delivering.

Applying the above mechanisms at scale allows the creation of a CDN which at a minimum may know only the location of a mezzanine file for each piece of content (or for each subset of content, that is, each chunk). Then seeds can be created for each variant (potentially all the way down to chunk level). These seeds can start propagating across the CDN. The number and distribution of each copy of content variants can be adjusted by a network operator by implementing policies. A simple example of this is to use TTL, as set out above, to determine availability of content variants. This may find particular use in managing the distribution of for long tail contents or rarely requested variants.

Local Delivery of Content

Homenet is a networking manager that manages a home network configuration and capabilities and allows information to be exchanged in the home network. A Homenet implements the Homenet Control Protocol (HNCP). As used herein, a home network comprises a plurality of nodes (servers, routers, personal computers, tablets etc.) each located in the same Layer 2 domain. As an example, a local area network LAN may be thought of as a home network for the purposes of this description.

The ability of a device to retrieve media from another device that is connected to the same home network (i.e. two devices that are connected to the same local network) can reduce the load on ISPs, servers and provide content at a faster rate to the user. For example, if content is available locally the device can retrieve that content from another device connected to the local network instead of connecting, via an ISP, to an external server to retrieve the content.

As described above, the use of IPv6 in a network allows content to have a unique IP address and therefore traffic can be addressed to a specific piece of content via the IP address. A client in a home network trying to access the piece of content may look for the location that can provide that content with the lowest latency. The location with the lowest latency may be a server that is accessed via an ISP or in the cache of another device that is connected to the home network.

In an example the client, using an IPv6 address that is specific to the content, sends a request for the content to the network. The network determines whether another device connected to the home network has that content cached based on advertisement messages sent by the network devices. If the content is cached on another device connected to the home network the network determines whether accessing the content from that local device has a lower latency than accessing the content from a server connected to the home network via an ISP. The content is delivered to the device using the lowest latency route.

Figure 7:
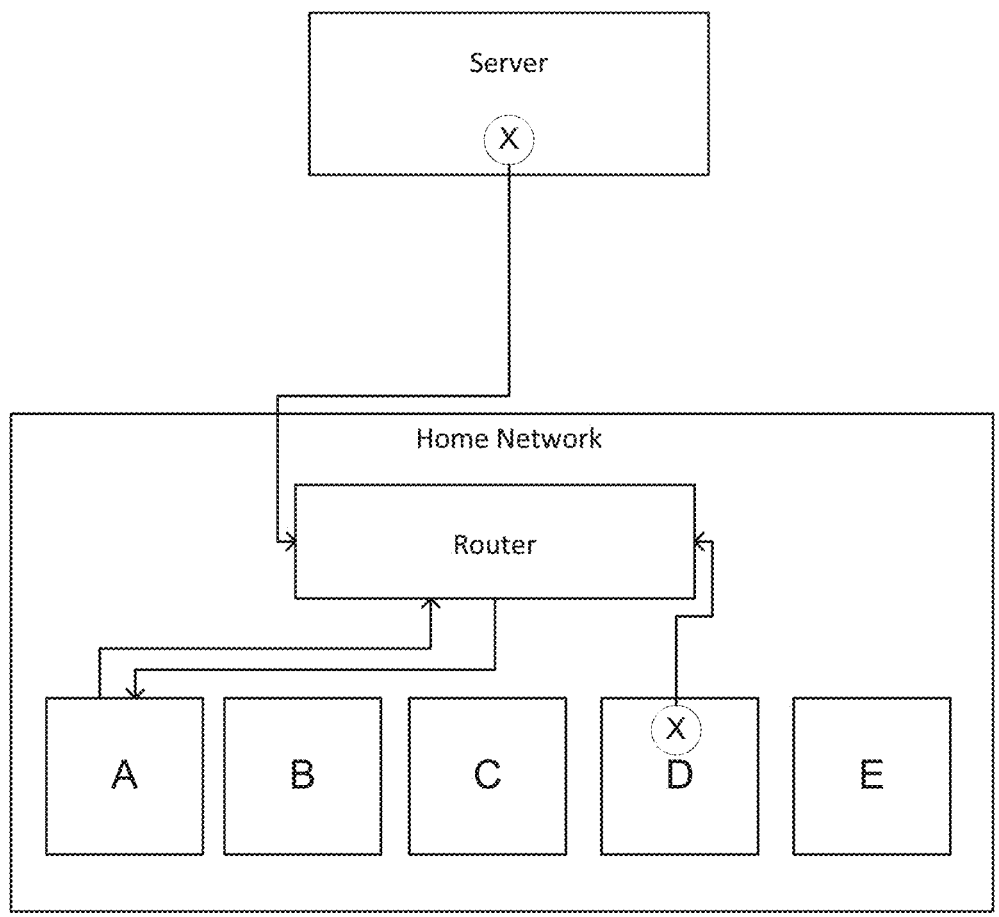
FIG. 7 shows an illustration of content being provided by a content server or another device connected to the home network.

In the example illustrated in FIG. 7, devices A, B, C, D and E are connected to a home network. A user of device A requests the content X. Device A then sends a request for content X, via the IPv6 address of content X, to home network devices, in this case a router of the home network. The router then determines destination addresses (IPv6 content addresses) advertised by each of devices B, C, D and E, whether any of the locally-connected devices in the home network can provide the content. In the example illustrated in FIG. 7, content X is located both on the server and is in the cache of device D. In this example, the router then determines whether accessing the content via the server or via the cache of device D has the lowest latency. The router then delivers the content to device A via the lowest latency route so that the content is provided to the user at the fastest rate.

Similarly, the route chosen may take account of the capabilities of the nodes along the route. For example, various nodes may not be able to handle the content, for example because they are currently operating at maximum capacity, because they have insufficient local storage to cache the content as it traverses the node, or because the node does not have the correct permissions (e.g. if there is a digital rights management conflict between the content and the node).

The use of a unique IPv6 address for content X allows content discovery based on the IP address. This allows each device to identify content X saved in the cache of device D and advertise the presence of this content (IPv6 destination) to other local devices, and potentially to devices outside the home network as discussed in more detail below.

The provision of content to a device using content stored in the cache of other devices connected to the home network may provide content at a faster rate to the device requesting the content compared to retrieving that content via an ISP from a server.

In addition, retrieving the content from the cache of a core network device that is also connected to the home network can reduce the load on the ISP and/or content server. For example, a spike in the demand for a particular content (i.e. the latest episode of a hit TV show) can lead to additional strain on both an ISP and a server that is providing that content. This can increase latency both for a user of a device connected to home network who requesting that particular content and for other users of devices not connected to the home network because of the strain on the core network and content server.

Injecting Content into the Home Network

As discussed above, a spike in demand for a particular content can lead to strain on both the ISP and the server. For example, the latest episode of a hit TV show may be released at a certain time and a large number of users will want to access that episode following its release. This can lead to a high burden on both the server that holds the content and the ISP used to access the content. The strain on the ISPs and server may be reduced by injecting the content into the home network. For example, when the content (e.g. a new episode) is released by the content provider the content may be injected into the home network so that a copy of the content is available in the cache of one of the devices connected to the home network. When a device that is connected to the home network requests the content that has that unique IPv6 address the content will be available via the cache of one of the devices connected to the home network and, provided that the latency is lower than retrieving the content from the server, the device will retrieve the content from the cache of that device.

Figure 8:
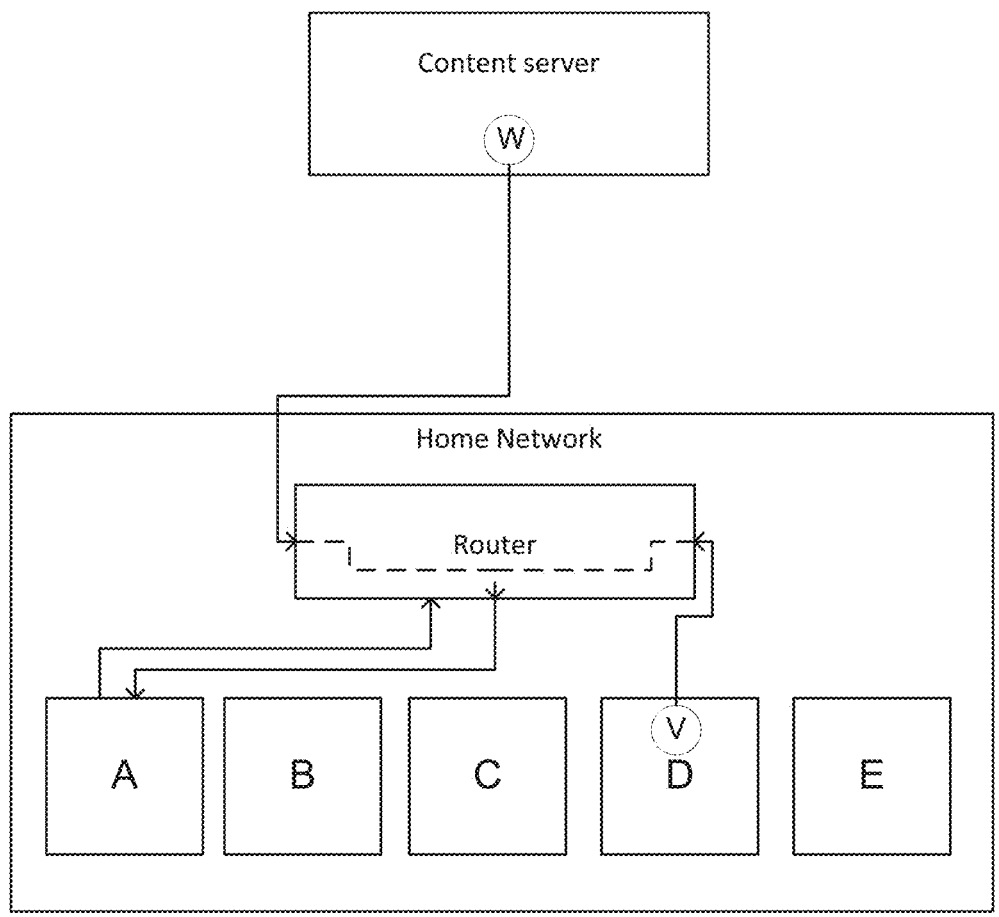
FIG. 8 shows an illustration of one chunk of content being provided by a content server and another chunk by a device connected to the home network.

As illustrated in FIG. 8, content Z may be injected from a server via the router to a device that is connected to the home network, in this example the content is injected into the cache of device D. The content Z is injected into the network by sending content Z from the server via the ISP to the router. The router then sends the content to one of the devices that is coupled to the network, in this example one of devices A, B, C, D or E, and the content is saved in the cache of that device.

In the examples described above the content is injected into one of the devices that is connected to the home network. In other examples the content may be injected into more than one of the devices of the home network. For example, multiple devices connected to the home network may have the content injected in the cache. Injecting the content into multiple devices will provide additional locations on the home network for the content to be accessed and therefore may reduce the burden on each device when a more than one user on the home network tries to access the content simultaneously.

As described above, a request from a user for content having a unique IPv6 address may be directed to retrieve that content from the cache of another device connected to the home network. In doing so the number of requests to the server for that particular content is reduced and therefore the load is reduced. In a situation where there is an anticipated spike in demand for content or particular content is frequently requested injecting that content into the home network so that a cached copy is available may prevent repeated downloading of the content from the server from various devices connected to the home network. This may lead to a reduction in the latency for the users of the home network and reduce the number of users accessing the content from the server and therefore reduce the likelihood of the server and/or ISP being overloaded due to requests for that particular content.

In an example, ISP content with ISP 6CN addresses may be "injected" into the home using an ISP gateway, a Home Control Protocol (HNCP) which is a configuration protocol that enables automated configuration of addresses or a host attached to the LAN of the client. The ISP gateway, the HNCP or the host attached to the LAN of the client can all advertise a given destination that has the ISP content is within the home rather than within the ISP network itself. This amounts to advertising a "more specific" route for traffic in the Home.

This may also be done for Over the Top (OTT) traffic. As described above, a user in a home receives content over the network from an OTT provider. The OTT provider may also inject content into the home. In this example, the home network may advertise local reachability for routes on the internet at large (i.e. content that is available from the OTT provider) that correspond to 6CN content that has been injected into the home network and is saved in the cache of one of the devices connected to the home network.

In an example, 6CN content may also be discoverable via local LAN discovery protocols. In a IPv6 network the use of "service discovery" protocols may return an IP address of a service to return instead of the IP address of 6CN content.

Home networks may use a variety of "service discovery" mechanisms. For example, the home network may use mDNS, UPnP, LLMNR. IP addresses are often part of the service discovery in all of these protocols, for example, during the discovery of the IP address of a Printer that is connected to the home network. In a network using 6CN, the IPv6 address of the content itself is discovered. The 6CN content address may be advertised at a single address or aggregate set of addresses. In an example a single MAC address may be used to return an aggregate v6 prefix that identifies the home network.

Segment Routing and Content Delivery within a Home Network

Segment Routing in an IPv6 a network is described in detail above. A home network using IPv6 may apply segment routing to deliver content to the device of a user more efficiently. As described above, segment routing allows content to be delivered in a number of segments and the different segments of the content may be identified using the IPv6 address.

In the home network using IPv6 a device connected to the home network may be able to retrieve content via a number of chunks and one or more of those chucks may be located in the cache of another device in the home network or on a server.

Figure 9:
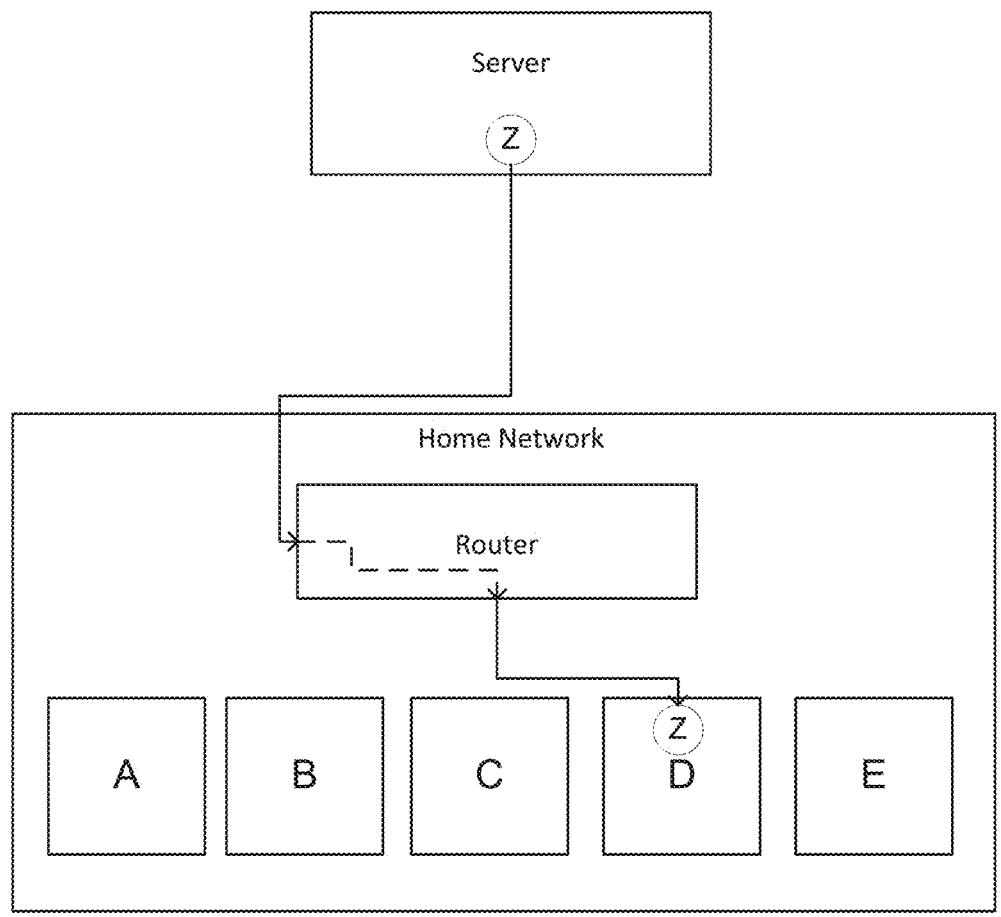
FIG. 9 shows an illustration of content being injected into the network.

An example of segment routing in a home network using IPv6 is illustrated in FIG. 9. In this example device A requests a particular piece of content having an IPv6 address. The content is available in two chunks, chunks W located on the server and chunks V located on device D connected to the home network. The router identifies the IPv6 address of chunk W and chunk V and determines that the content requested by device A can be provided in the form of two chunks, chunk W and chunk V. The router then delivers the content to device A in the form of two chunks, one chunk which is from a server and one chunk that is from the cache of another device connected to the home network.

In the example illustrated in FIG. 9 the content is delivered to the device in the form of two segments. The content may also be delivered in the form of more than two segments. These segments may be located on a number of different devices connected to the home network and, if substantially all the segments are available on devices connected to the home network it may not be necessary for the router to retrieve a segment from the server.

Peer-to-Peer Between Homes

In addition to content having an IPv6 address being accessible in a home network, a device that is external to the home network may be able to access retrieve content that is stored in the cache of a device that is connected to the home network. The ability to retrieve content not only from the cache of other devices connected to the home network and the content server but also from the cache of other devices connected to other networks may increase the capacity of the network and increase the speed at which content can be delivered to the device requesting content.

The provision of a unique IPv6 address for specific content, for example a proportion of the IP address associated with that content, allows the location that content to be advertised and accessed using the IP address of the content. For example, the content that a device is requesting may be available via a server or a device that is connected to neighbouring network. The advertisement of the unique IPv6 address for the content allows the ISP to determine where it is possible to retrieve the content and then select the optimum location for retrieval.

Figure 10:
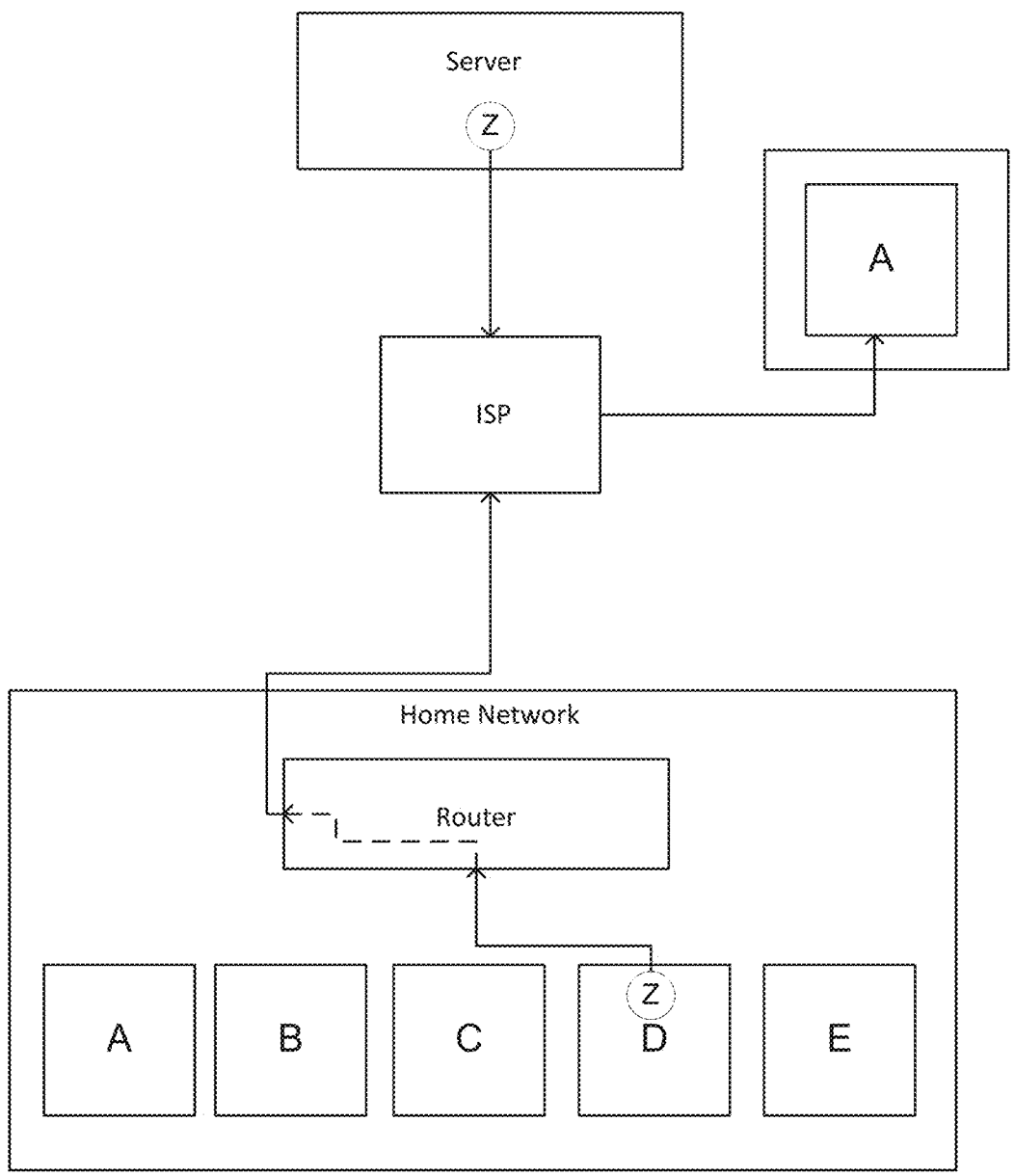
FIG. 10 shows an illustration of content being provided by a content server or another device connected to another network.

An example of content retrieval from a neighbouring network is illustrated in FIG. 10. In this example the user of device A requests content Z which has a unique IPv6 address. Device A sends a request for content Z using the unique IPv6 address. The network determines that content Z is available from the server and device D, which is connected to a different network to device A. The ISP then determines whether retrieving which route has the lowest latency, i.e. would it be quicker for device A to retrieve content Z from device D or the server.

In an example the IPv6 address for content has a first prefix that is associated with the location that the content is stored and a second portion that is associated with the content itself. This allows the content to be advertised using the second portion, i.e. a device may advertise to the router the portion of the IP address that is associated with the content and then the router, upon receiving a request for that content can direct the request so that the content is retrieved from that device.

In this example, the device alters the IP address upon receiving the content. When the device receives the content from a server the device amends the IP address of the content so that the first prefix of the IP address is associated with the new location of the content, i.e. the home address.

Home Generated Content

A substantial amount of content is now generated by home users. For example, a user may upload a video clip or a photo to and that video clip or photo may have been generated by the home user. As described above, in an IPv6 network each piece of content can have a unique IP address. The content that is generated by a user therefore requires an IPv6 address assigned to it to allow that content to be retrieved using an individual IP address. The content owned by the user is packaged using 6CN content packaging and a content ID IPv6 address assigned for that content.

The requirements of a home user will vary according to how frequently they generate content and the nature of the user. The owner of the content may therefore "package" the content themselves (i.e. within the home) or a distributor may package the content before handing the content package off to the ISP. For example, the preparation and packaging may be done as a service for the home user by sending the content to a 3rd party data centre where the package is generated.

In the example where the 6CN preparation and packaging is done by a home user a number of restrictions may be applied. For example, it may be required that the packaging service is discoverable by various service discovery means, including Apple Bonjour (mDNS), Windows LLMNR, etc., and a new multicast DMS (mDNS) may also be defined as well as DNS record to advertise the presence of a 6CN packaging service.

The home 6CN packaging service may include the ability to receive a stream of video or read from a content file, process the data, and output a set of 6CN content packages. The 6CN packaging service may also include the selection and assignment of an IPv6 address or addresses conforming to various address encoding standards as supported by the packaging function. The packaging function may need to be in contact with a configuration service in order to receive necessary parameters in order to package and assign the address accordingly.

The 6CN address in the home consists of two parts, one of which is made up of the home's global IPv6 prefix (e.g., received from a connected ISP) or a Unique Local Address (ULA) prefix for the home. If neither a global IPv6 prefix for the home or a ULA is available, a link-local prefix may be used. Discovery of the prefix by the packaging service may be done via participation in HNCP (e.g., when an IETF Homenet is being used), or by inspecting the prefix of the IPv6 address received via an IPv6 Router Advertisement (RA) or DHCPv6 lease.

As described above the division of the IPv6 address is variable, therefore the prefix length available in the home overall may be variable. 6CN will generally adopt 64 bits for a given home address, leaving 64 for the 6CN content ID. The second part of the address is calculated based on known information about the content (e.g., taken from the content meta data or otherwise) and the 6CN content ID formatting the packaging function is configured to support. In the event no standard or preferred formatting is available, a random value may be used.

Once a content ID is selected, the packager performs a "duplicate address detection" (DAD) process (DAD is part of standard IPv6 operation within "neighbour discovery") in order to determine whether the given address is already in use. If not, this becomes the address for use within the home (and potentially the internet at large) for the 6CN content. It is up to the packager to then "defend" the allocation of this address on a given link corresponding to the IPv6 prefix the 6CN content ID is combined with in order to construct the full 6CN address.

In an example, an IPv6 Homenet (ie running HNCP) allocates a LAN segment to 6CN. For example, a content server in the Homenet running the HNCP protocol announces to the HNCP routers that it has an entire link with hosts attached. HNCP includes that link within the topology, assigns a /64 IPv6 prefix to it (and potentially an IPv4 prefix as well) and injects this within the local routing system (unlike most home networks, an HNCP network includes a proper IP routing protocol). This prefix is then used with the 6CN content ID to address content on that server. This may not require individual IPv6 addresses to be "defended" with DAD, with the disadvantage that it uses an entire LAN segment prefix which is more limited.

A Homenet may operate by allocating a LAN segment depending on the size of the home LAN and the number of prefixes allocated to the home. The Homenet could also consider a less-than /64 prefix just for the content cache.

The Homenet may also inject its own ULA rather than using a global prefix. This has the advantage of being routable only from within the home, for example for increased security or because the sharing of the content is restricted due to DRM, and does not use publicly routable address space.

Once the IPv6 address is assigned, as described above, the IPv6 address may be advertised such that clients can reach it. When operating in a Homenet, this is much easier as there is a routing protocol to advertise reachability and HNCP to assign an aggregate prefix for all cached content. When not operating in a Homenet, content prefixes will exist on a LAN segment as if they are individual hosts, or a group of hosts attached to a neighbour discovery proxy (ND-Proxy) function defending all content addresses within a prefix range. Clients contacting the IPv6 address of a 6CN content object will then be routed to the content within the home.

The 6CN content may also be routed between homes. This can be done using global addressing (i.e. Fully Qualified Domain Names (FQDNs) into DNS, etc.) as would any IPv6 address and domain name on the Internet at large, or via a more direct interaction between two homes or users. A name to IPv6 address mapping service may be able to provide suitable authentication and API, via the interface of a user's "set top box" provided by their ISP/TV provider. The authentication and API may include any of the various social media services.

Figure 11:
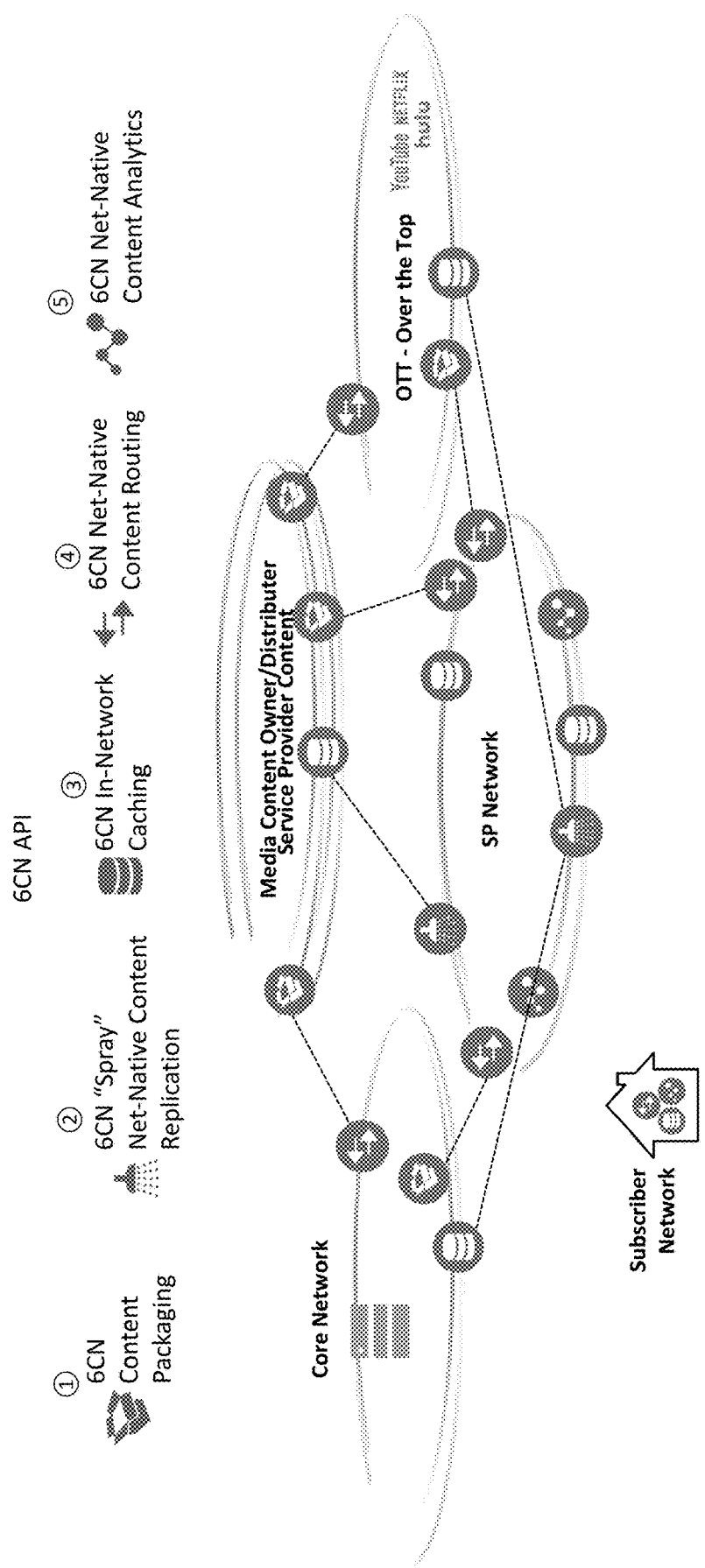
FIG. 11 shows an example of a 6CN Global Traffic Manager (GTM)
Figure 12:
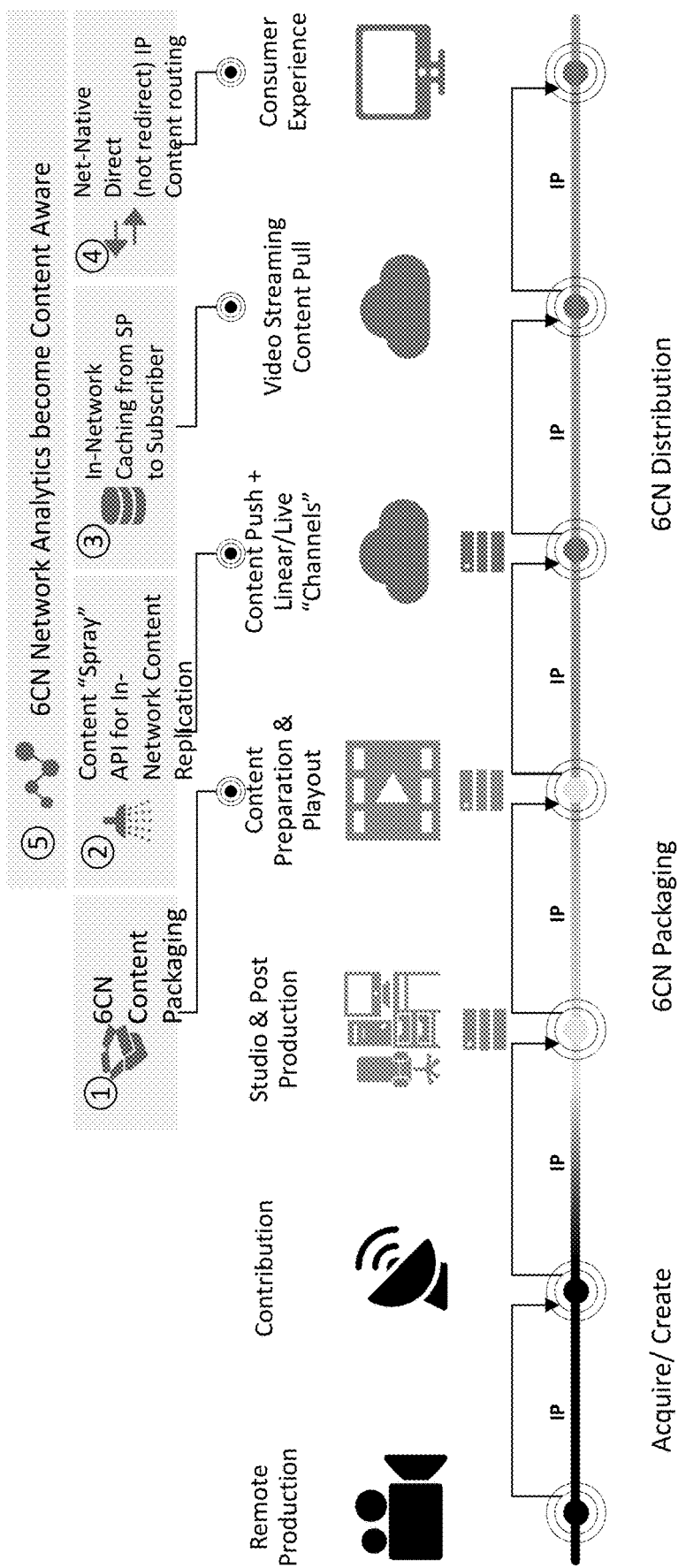
FIG. 12 shows a process in which a video is distributed.

FIG. 11 shows an example of a 6CN Global Traffic Manager (GTM). This example shows the interaction in a network comprises a cisco network, a service provider (SP) network, a media content owner/distributer service provider content and an over the top (OTT) provider FIG. 12 shows a process in which a video is distributed. The flowchart shows an example of how the video is provided to a consumer in a 6CN network. The video is firstly acquired and created, it is then packaged using 6CN and finally distributed using 6CN.

Figure 13:
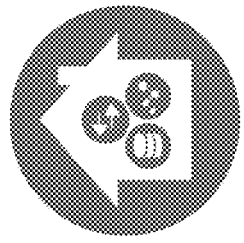
FIG. 13 shows an illustration of massively distributed in-network caching.
Figure 13:
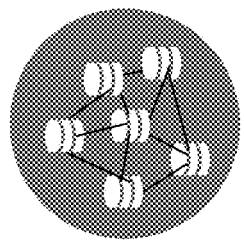
Figure 13:
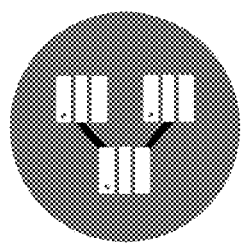

FIG. 13 shows an illustration of massively distributed in-network caching. This includes a process to augment existing CDN nodes with 6CN capability, developing container based micro-service content delivery and a process of caching the content anywhere a container can run and IPv6 can reach.

The present disclosure also envisages one or more computer programs, computer program products or logic encoded in computer-readable media for implementing any method claimed or described herein. It will be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Throughout the description, references to components or nodes of the network should be construed broadly, and in particular may comprise several subcomponents or modules working in combination to achieve the stated effects. These subcomponents may themselves be implemented in hardware or software. Likewise, many different components may be combined together as one component, for example a single processor may carry out many functions simultaneously. Similarly, any reference to operational steps may comprise hardware, software, or a combination of the two. As already noted, any method described herein, or any part thereof may be carried out by a computer program, or a computer program product.

References herein to components being connected to one another should be interpreted as meaning either directly connected, or indirectly connected, for example being connected via other components. Indeed, in the case of complex networks, components may be both directly and indirectly connected to one another. Examples of such connection may commonly include, but are not limited to: electronic connections through wires or cables; fibre optic connections; and wireless communication, for example via radio waves, microwaves or infrared.

In the present disclosure, references to networks should be interpreted broadly. In particular, the internet is often used as an example of a network, but is not limiting. The principles set out herein are applicable to all networks, comprising a collection of processors connected to one another. Connection may be direct, or via switches and routers. The network may further comprise servers and caches, depending on the exact nature of the network. When storage is discussed herein, this may include, without limitation one or more of magnetic, optical, solid state, volatile or non-volatile memory.

The steps associated with the methods of the present disclosure may vary. Steps may be added, removed, altered, combined, and reordered without departing from the scope of the present disclosure. Indeed, different aspects and embodiments of the disclosure herein may be combined with one another, in any combination and may be implemented in conjunction with one another in a particular network. In particular, individual components, and systems of components may be combined, the tasks of a single component divided between many subcomponents, or equivalent components interchanged without departing from the principles set out herein. Furthermore, features of one aspect may be applied to other aspects of the system.

Therefore, the present examples are to be considered as illustrative and not restrictive, and the examples are not to be limited to the details given herein, but may be modified within the scope of the appended claims.

What is claimed is:

1. A method comprising:
   receiving, at a routing device of a home network, a request for content from a first device of the home network, the request identifying the content using an IPv6 address for the content;
   determining, by the routing device of the home network in response to receiving the request for the content, whether the content is stored in a cache of a second device of the home network, wherein each of a plurality of devices of the home network is operative to advertise presence of the content and the IPv6 address of the content to other of the plurality of devices of the home network;
   upon determining the content is stored in the cache of the second device, determining, by the routing device of the home network, that accessing the content from the second device in the home network has a lower latency than accessing the content from a content server;
   sending, by the routing device of the home network in response to determining that accessing the content from the second device has a lower latency than accessing the content from a content server, the request to the second device for the content using the IPv6 address of the content; and
   forwarding the content to the first device from the second device, wherein the first and second devices are part of the same layer 2 domain.

2. The method according to claim 1, further comprising sending the request for content using the IPv6 address to a content server on the home network.

3. The method according to claim 1, wherein the routing device determines a route for delivering the content to the first device via devices which are capable of caching and/or delivering the content and the content is forwarded to the first device using this route.

4. The method according to claim 1, wherein the content comprises a plurality of chunks and the first device receives chunks of the content from more than one device and/or content server.

5. The method according to claim 1, wherein the content comprises two or more chunks and the routing device receives the request for a plurality of chunks of the content.

6. The method of claim 5, wherein the first device receives a first chunk of the content from the second device and a second chunk of the content from another device.

7. A non-transitory computer readable medium that stores a set of instructions which when executed perform a method for injecting content to a home network, the method comprising:
   receiving a request for content from a first device of a home network;
   determining, in response to receiving the request for the content, whether the content is stored in a cache of a second device of the home network, wherein the second device of the home network is operative to:
      receive the content, wherein the content comprises an IPv6 address, the IPv6 address comprising an identifier of the content,
      store the content in a storage device associated with the second device, and
      advertising a route to the IPv6 address of the content stored in the storage device;
   in response to determining the content is stored in the storage device associated with the second device, determining that accessing the content from the storage device has a lower latency than accessing the content from a content server;
   sending, in response to determining that accessing the content from the storage device has a lower latency than accessing the content from the content server, the request to the storage device for the content using the IPv6 address of the content; and
   forwarding the content to the first device from the storage device.

8. The non-transitory computer readable medium according to claim 7, wherein the content is previously accessed by one or more devices connected to the home network.

9. The non-transitory computer readable medium according to claim 7, wherein the content is injected in the home network from an Over the Top (OTT) provider.

10. An apparatus comprising:
    a memory storage; and
    a processing unit coupled to the memory storage, wherein the processing unit is operative to:
       receive a request for content from a first device of a home network;
       determine, in response to receiving the request for the content, whether the content is stored in a cache of a second device of the home network, wherein the second device of the home network is operative to:
          receive the content,
          generate a content package for the received content, wherein the content package comprises an IPv6 address having a first part comprising a prefix identifying the home network and a second part comprising an identifier of the content,
          store the content in a storage device associated with the second device in the home network, and
          advertise a route to the IPv6 address of the content stored in the storage device;
       in response to determining the content is stored in the storage device associated with the second device, determine that accessing the content from the storage device has a lower latency than accessing the content from a content server;
       send, upon determining that accessing the content from the storage device has a lower latency than accessing the content from the content server, the request to the storage device; and
       forward the content to the first device from the storage device.

11. The apparatus according to claim 10, wherein the second device being operative to receive the content comprises the second device being operative to receive a stream of content or reading content from a content file.

12. The apparatus according to claim 11, wherein the prefix identifying the home network comprises a global IPv6 prefix or Unique Local Address prefix for the home network.

13. The apparatus according to claim 12, wherein the global IPv6 prefix or Unique Local Address prefix is received from a connected ISP.

14. The apparatus according to claim 10, wherein the processing unit being further operative to calculate the second part of the IPv6 address comprising the identifier of the content based on parameters associated with the content.

15. The apparatus according to claim 10, wherein the processing unit determines a route for delivering the content to the first device via devices which are capable of caching and/or delivering the content and the content is forwarded to the first device using this route.

16. The non-transitory computer readable medium according to claim 7, wherein the instructions when executed perform the method further comprising determining a route for delivering the content to the first device via devices which are capable of caching and/or delivering the content and the content is forwarded to the first device using the determined route.

17. The non-transitory computer readable medium according to claim 7, wherein the content comprises a plurality of chunks and the first device receives chunks of the content from more than one device and/or content server.

18. The non-transitory computer readable medium according to claim 7, wherein the identifier comprises a prefix identifying the home network, and wherein the prefix comprises a global IPv6 prefix or Unique Local Address prefix for the home network.

19. The non-transitory computer readable medium according to claim 18, wherein the global IPv6 prefix or Unique Local Address prefix is received from a connected ISP.

20. The non-transitory computer readable medium according to claim 7, wherein the IPv6 address comprises a first part comprising a prefix identifying the home network and a second part comprising the identifier of the content.

* * * * *